J. E. THORNTON.
PHOTOGRAPHIC FILM FOR FILM PACKS, CHANGING BOXES, CAMERAS, AND THE LIKE.
APPLICATION FILED MAY 6, 1907.

1,098,535.

Patented June 2, 1914.

Witnesses:
E. W. Carroll
D. Gurnee

Inventor:
John Edward Thornton
by his attorneys
Osgood Davis & Dorsey

UNITED STATES PATENT OFFICE.

JOHN E. THORNTON, OF ALTRINCHAM, ENGLAND, ASSIGNOR TO FIREPROOF FILM COMPANY, A CORPORATION OF MAINE.

PHOTOGRAPHIC FILM FOR FILM-PACKS, CHANGING-BOXES, CAMERAS, AND THE LIKE.

1,098,535.      Specification of Letters Patent.      Patented June 2, 1914.

Application filed May 6, 1907. Serial No. 372,056.

*To all whom it may concern:*

Be it known that I, JOHN EDWARD THORNTON, British subject, and resident of Altrincham, county of Chester, England, have invented certain new and useful Improvements Relating to Photographic Films for Film-Packs, Changing-Boxes, Cameras, and the like, of which the following is a specification.

This invention relates to photographic films of the type in which an extension or tab is provided to facilitate the manipulation of the film.

Films made according to this invention are especially suitable for use in film-packs, wherein a number of films are contained in a sealed packet, which is inserted in the camera, the films being manipulated successively, after exposure, by means of the tab-extensions provided for this purpose.

The object of the present invention is to produce a tabbed film in which the layers of material are so formed, particularly at the junction between the tab-extension and the body of the film, as to avoid pronounced edges or shoulders upon the superposed layers where they cross the tab-extension; and to this end I form the superposed layers in such a manner that at this point they taper in thickness to the surface of the tab-extension, or to a line substantially at the junction between the extension and the body of the film. While this may be accomplished in various ways, it is preferably and most simply accomplished by spreading the material for such layers in liquid form upon a smooth support of glass or other material, and the fluid material so spread assumes naturally, as the result of surface-tension, a smoothly reduced or tapered form at its margin where it crosses the tab-extension, thus avoiding a sharp edge and pronounced angle or shoulder such as would be produced by the use of a layer of previously solidified material with cut or trimmed edges.

Figure 1:
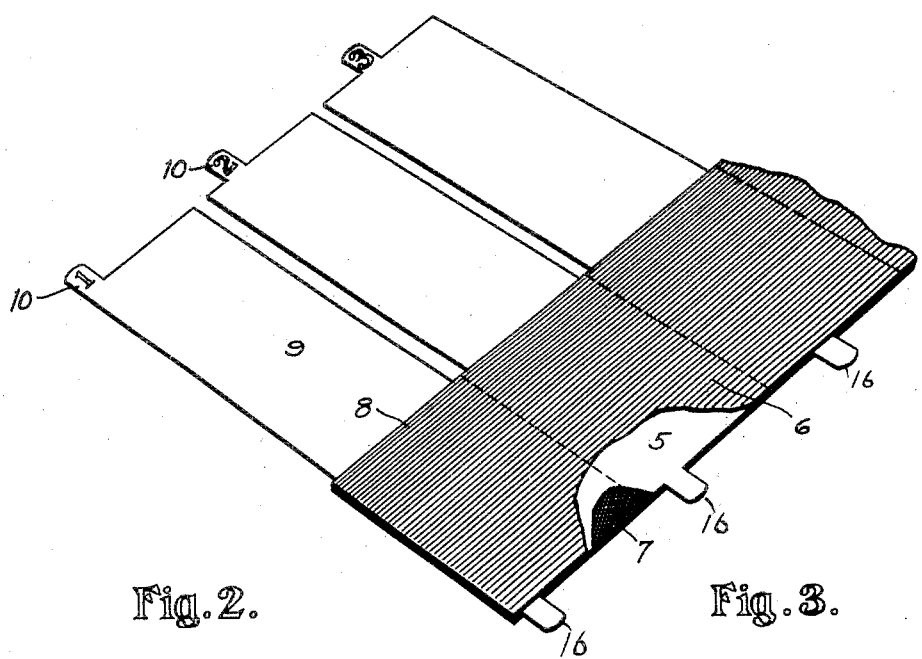
Figure 2:
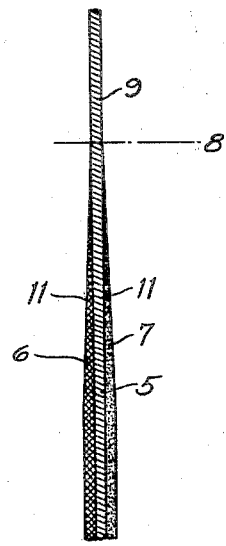

In the accompanying drawings:—Figure 1 is a perspective-view of a strip of films partially completed in accordance with the present invention; Fig. 2 is a partial section, upon a greatly enlarged scale, of a film embodying the invention; and Fig. 3 is a similar section, showing the invention in a modified form.

In carrying out the present invention all of the layers, including the celluloid base, may be made by spreading material in liquid form upon a suitable smooth, clean support of glass or other impervious material. To form the structures shown in Figs. 1 and 2 this support is first coated with a layer 7 of gelatin, equal in width to the base or body of the required film. When this material has solidified the layer 7 and the support are next coated with a layer 5 of celluloid in liquid form, and finally a third layer 6, of sensitized emulsion, is superposed upon the celluloid. The layer 6 is of only the width of the body of the film, while the celluloid layer is made enough wider to provide for the integral tab-extensions. The entire strip may then be trimmed to produce the required outline and the integral tab-extensions 9, the product then having the appearance of Fig. 1, and the several films may then be cut apart on the dotted lines in this figure, thus completing the films. The tab-extensions may be of any required form, and they are illustrated as having numbered tabs 10 to facilitate the manipulation of the films, while similar tabs 16 project, for the same purpose, at the rear edges of the films. Owing to the fact that the margins of both of the layers 6 and 7, where they cross the junction between the bodies 5 of the films and the tab-extensions 9 therefrom, are uncut, and have the form resulting naturally from the flowing of the liquid material when spread as above described, these margins are smooth and tapered, as shown in a somewhat exaggerated manner at the points 11 in Fig. 2, and are terminated by edges which are firmly united to the celluloid layer without any pronounced angles or salient portions. The positions of these edges are somewhat indefinite, but are indicated approximately by the lines 8 in the drawings.

Figure 3:
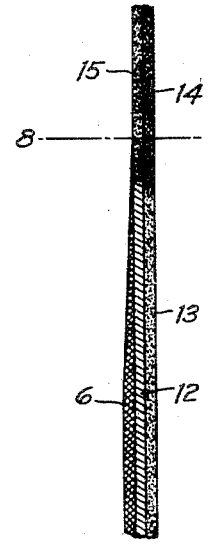

In place of forming the tab-extensions integral with the base-layer of celluloid, they may be formed integral with one of the layers of gelatin, or other material, which are superposed upon the base; preferably with the gelatin backing, as shown in Fig. 3. In this case a layer 13 of gelatin solution material is first spread upon the support, this layer being sufficiently wide to provide integral tab-extensions 14. To increase the thickness and strength of these extensions a second layer 15 of similar material may then be spread, this layer being only of a width corresponding to the required length of the tab-extensions. A layer 12 of celluloid may then be spread upon the layer 13, terminating at the edge of the layer 15. Finally, a layer 6 of sensitized material may be spread upon the celluloid 12, extending slightly beyond the junction between the layers 12 and 14, as shown in Fig. 3. The material so formed may then be trimmed to shape as in Fig. 1, or in any required shape, the tab-extensions being formed from the layers 14 and 15 which, owing to the similarity of their materials and the method of their manufacture, are substantially integral.

I claim:

1. A tab-film consisting of a plurality of solidified coatings of cellulosic and colloidal solutions superposed one upon the other, one at least of which has a portion extended beyond the others to form a tab extension, the edges of the other coatings, where they cross the tab extension, being directly adherent to the tab-forming coating and having the tapered form resulting naturally from the flowing of the coating-solutions prior to solidification.

2. A tab-film consisting of a plurality of solidified adherent coatings of cellulosic and colloidal solutions superimposed one upon the other, one at least of which is extended beyond that part of the film that is to be exposed, to serve as a tab extension, the other coating or coatings being tapered at their margins adjacent the tab extension so as to avoid the production of a pronounced shoulder or edge at this point, substantially as shown and described.

In witness whereof, I have hereunto signed my name in the presence of two subscribing witnesses.

J. E. THORNTON.

Witnesses:
J. OWDEN O'BRIEN,
B. TALHAM WOODHEAD.